US012657117B2

(12) United States Patent
Verma et al.

(10) Patent No.: US 12,657,117 B2
(45) Date of Patent: Jun. 16, 2026

(54) FAULT SET SELECTION

(71) Applicant: INTERNATIONAL BUSINESS MACHINES CORPORATION, Armonk, NY (US)

(72) Inventors: Mudit Verma, New Delhi (IN); Harshit Kumar, New Delhi (IN); Sandeep Hans, New Delhi (IN); Ruchi Mahindru, Elmsford, NY (US); Praveen Jayachandran, Bangalore (IN); Eitan Daniel Farchi, Haifa (IL); Diptikalyan Saha, Bangalore (IN); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 18/214,902

(22) Filed: Jun. 27, 2023

(65) Prior Publication Data

US 2025/0004929 A1 Jan. 2, 2025

(51) Int. Cl.
*G06F 11/3668* (2025.01)
*G06F 11/34* (2006.01)

(52) U.S. Cl.
CPC ...... *G06F 11/3688* (2013.01); *G06F 11/3476* (2013.01)

(58) Field of Classification Search
CPC ................................................... G06F 11/3688
See application file for complete search history.

(56) References Cited

U.S. PATENT DOCUMENTS 10,102,111 B2 * 10/2018 Rajagopalan ....... G06F 11/3672
10,169,220 B2 * 1/2019 Rajagopalan ....... G06F 11/3688
(Continued)

FOREIGN PATENT DOCUMENTS

| CN | 110262972 | | 9/2019 | |
|----|-----------|---|--------|---|
| CN | 113935178 | | 1/2022 | |
| CN | 116627689 | A * | 8/2023 | ............ G06F 11/079 |
| CN | 116737436 | A * | 9/2023 | ............ G06F 11/079 |

OTHER PUBLICATIONS

Cotroneo, Domenico, et al. "Fault injection analytics: A novel approach to discover failure modes in cloud-computing systems." IEEE transactions on dependable and secure computing 19.3 (2020): 1476-1491.*

(Continued)

*Primary Examiner* — Francisco J Aponte
(74) *Attorney, Agent, or Firm* — Seed Intellectual Property Law Group LLP

(57) ABSTRACT

Embodiments receive a plurality of faults for at least one microservice in a cloud native based application within a fault set selection server; inject the faults into at least one microservice in the cloud native based application within the fault set selection server; obtain a system state representation for each of the injected faults in the at least one microservice in the cloud native based application using an unsupervised clustering algorithm; derive a fault subset based on the system state representation for each the faults in the at least one microservice in the cloud native based application; and inject the derived fault subset into the at least one microservice in the cloud native based application and logging behavior of the at least one microservice in the cloud native based application with the injected derived fault subset.

15 Claims, 5 Drawing Sheets

(56) References Cited

U.S. PATENT DOCUMENTS

| | | | | |
|---|---|---|---|---|
| 10,684,940 | B1 | 6/2020 | Kayal et al. | |
| 11,030,068 | B1 * | 6/2021 | Agarwal | G06F 11/327 |
| 11,321,217 | B1 * | 5/2022 | Agarwal | G06F 11/302 |
| 11,526,425 | B1 * | 12/2022 | Karis | G06F 11/3644 |
| 11,789,804 | B1 * | 10/2023 | Danyi | G06F 11/323 |
| | | | | 714/38.1 |
| 11,847,046 | B1 * | 12/2023 | Ayyadurai | G06F 11/3684 |
| 12,259,799 | B1 * | 3/2025 | Hornsby | G06F 11/263 |
| 12,284,312 | B2 * | 4/2025 | Gonzalez | H04M 3/242 |
| 12,455,807 | B1 * | 10/2025 | Agarwal | G06F 11/3698 |
| 2021/0133015 | A1 * | 5/2021 | Agarwal | G06F 16/2455 |
| 2021/0232485 | A1 * | 7/2021 | Agarwal | G06F 11/3624 |
| 2021/0263836 | A1 * | 8/2021 | Singh | G06F 11/3698 |
| 2022/0060371 | A1 * | 2/2022 | Paradkar | H04L 41/0677 |
| 2022/0350895 | A1 * | 11/2022 | Agron | G06F 21/554 |
| 2023/0040564 | A1 * | 2/2023 | Wang | G06F 18/29 |
| 2023/0252326 | A1 * | 8/2023 | Zake | G06N 3/092 |
| | | | | 706/12 |
| 2024/0028499 | A1 * | 1/2024 | Amador | G06F 11/3684 |
| 2024/0118991 | A1 * | 4/2024 | Zakharchenko | G06F 11/3698 |
| 2024/0223488 | A1 * | 7/2024 | Mary | H04L 43/0823 |
| 2024/0248830 | A1 * | 7/2024 | Shpilyuck | G06F 11/3006 |
| 2024/0385950 | A1 * | 11/2024 | Verma | G06F 11/3684 |
| 2024/0394162 | A1 * | 11/2024 | Hans | G06F 11/263 |
| 2025/0005162 | A1 * | 1/2025 | Baker | G06F 21/577 |
| 2025/0036546 | A1 * | 1/2025 | Anderson | G06F 11/3608 |

OTHER PUBLICATIONS

Wagner, Lion. Simulating scenario-based chaos experiments for microservice architectures. Diss. Universität Stuttgart, 2021.*

Cotroneo, Domenico, et al. "Enhancing the analysis of software failures in cloud computing systems with deep learning." Journal of Systems and Software 181 (2021).*

Bagehorn, Frank, et al. "A fault injection platform for learning aiops models." Proceedings of the 37th IEEE/ACM International Conference on Automated Software Engineering. 2022.*

Chen et al., "A Microservice Regression Testing Selection Approach Based on Belief Propagation", https://doi.org/10.21203/rs.3.rs-535094/v1, Feb. 13, 2023; 35 Pages.

Kammhoff, "Algorithms for Efficient Chaos Experiment Selection in Microservice Architectures", https://elib.uni-stuttgart.de/handle/11682/10884, Jul. 24, 2019; 132 Pages.

Gazzola et al., "Automatic Ex-Vivo Regression Testing of Microservices", https://www.researchgate.net/publication/340399442, Apr. 3, 2020; 5 Pages.

Tokopedia et al., "Implementation of Automated Chaos Testing to Improve Service Resiliency", https://ip.com/IPCOM/000269848, May 17, 2022; 8 Pages.

Hernández-Serrato et al., "Applying Machine Learning with Chaos Engineering", https://ieeexplore.ieee.org/document/9307734, Oct. 12-15, 2020; 3 Pages, Abstract.

Basiri et al., "Automating chaos experiments in production", https://arxiv.org/abs/1905.04648, May 12, 2019; 10 Pages.

Zhang et al., "Chaos Engineering of Ethereum Blockchain Clients", https://arxiv.org/abs/2111.00221, Jun. 18, 2023; 20 Pages.

Anonymous., "Principles of chaos engineering", http://principlesofchaos.org/, Mar. 2019, 3 Pages.

Jernberg et al., "Getting Started with Chaos Engineering—design of an implementation framework in practice", https://doi.org/10.1145/3382494.3421464, Oct. 23, 2020; 5 Pages.

Torkura et al., "Cloudstrike: Chaos engineering for security and resiliency in cloud infrastructure", https://ieeexplore.ieee.org/stamp/stamp.jsp?arnumber=9133399, Jul. 6, 2020; 17 Pages.

Canonico et al., "Human-AI Partnerships for Chaos Engineering", https://doi.org/10.1145/3387940.3391493, Sep. 25, 2020; 4 Pages.

\* cited by examiner

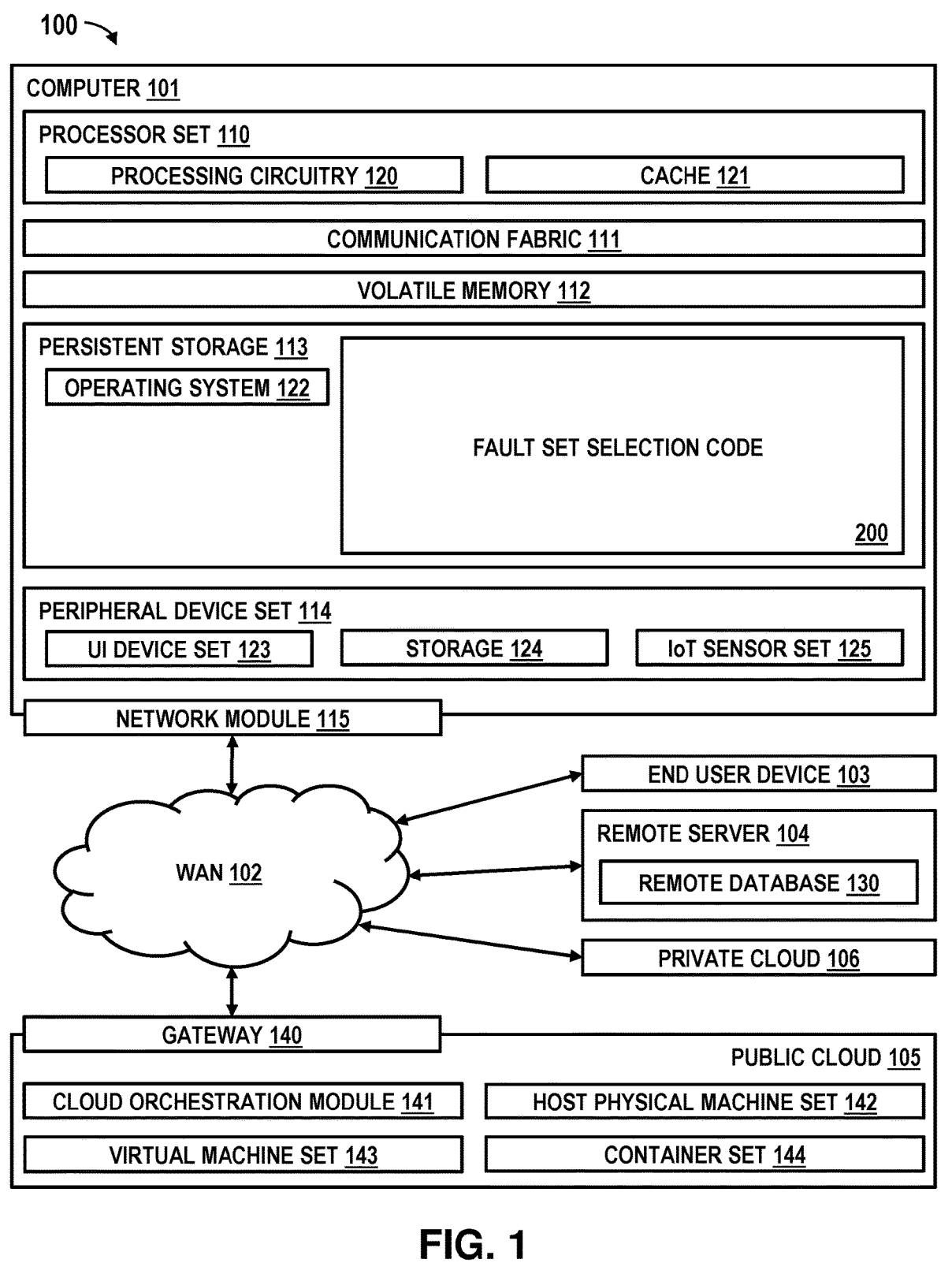

100 ⬎

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

FAULT SET SELECTION CODE

200

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

FIG. 1

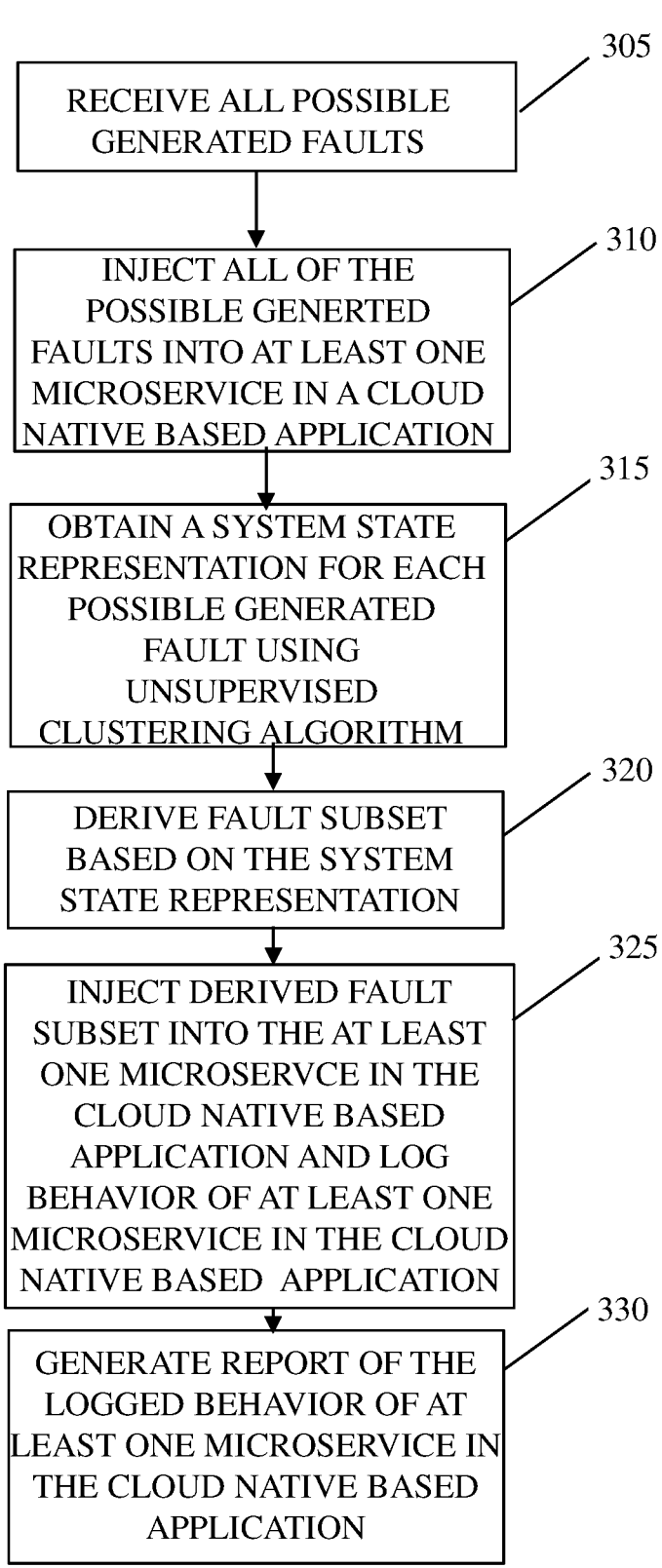

RECEIVE ALL POSSIBLE GENERATED FAULTS — 305

INJECT ALL OF THE POSSIBLE GENERTED FAULTS INTO AT LEAST ONE MICROSERVICE IN A CLOUD NATIVE BASED APPLICATION — 310

OBTAIN A SYSTEM STATE REPRESENTATION FOR EACH POSSIBLE GENERATED FAULT USING UNSUPERVISED CLUSTERING ALGORITHM — 315

DERIVE FAULT SUBSET BASED ON THE SYSTEM STATE REPRESENTATION — 320

INJECT DERIVED FAULT SUBSET INTO THE AT LEAST ONE MICROSERVCE IN THE CLOUD NATIVE BASED APPLICATION AND LOG BEHAVIOR OF AT LEAST ONE MICROSERVICE IN THE CLOUD NATIVE BASED APPLICATION — 325

GENERATE REPORT OF THE LOGGED BEHAVIOR OF AT LEAST ONE MICROSERVICE IN THE CLOUD NATIVE BASED APPLICATION — 330

FIG. 3

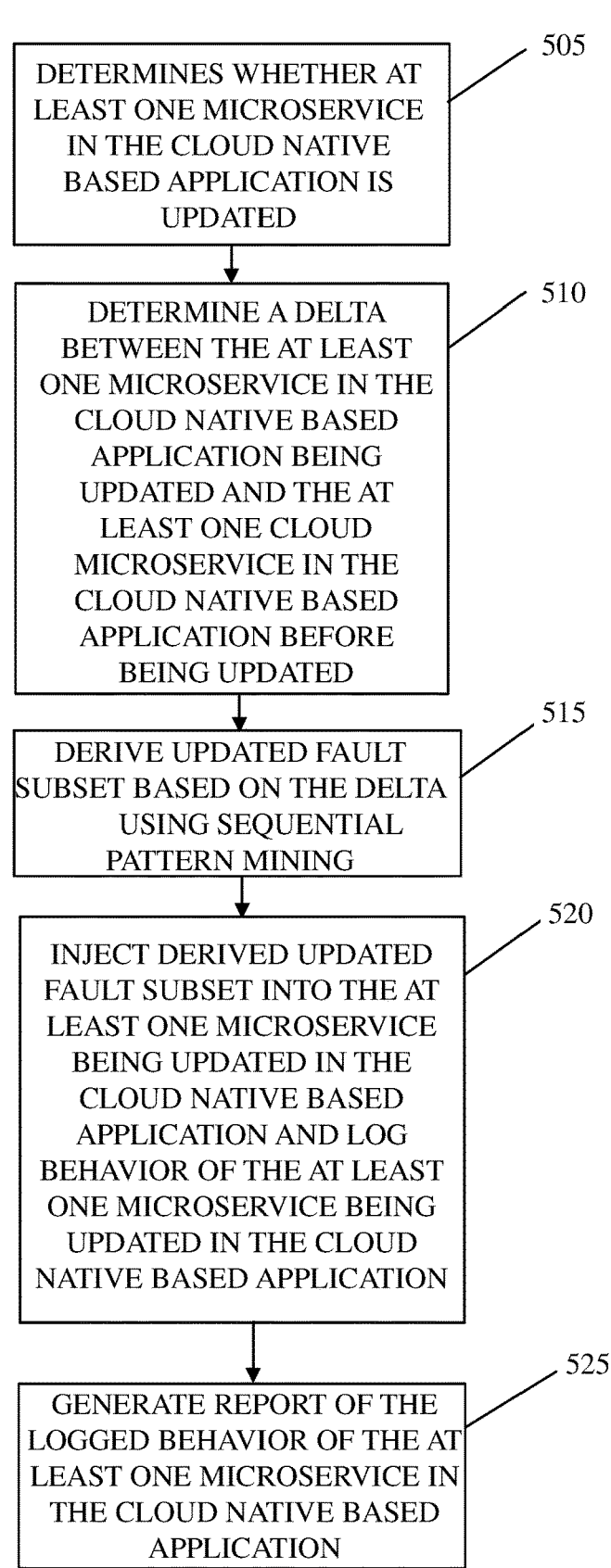

DETERMINES WHETHER AT LEAST ONE MICROSERVICE IN THE CLOUD NATIVE BASED APPLICATION IS UPDATED — 505

DETERMINE A DELTA BETWEEN THE AT LEAST ONE MICROSERVICE IN THE CLOUD NATIVE BASED APPLICATION BEING UPDATED AND THE AT LEAST ONE CLOUD MICROSERVICE IN THE CLOUD NATIVE BASED APPLICATION BEFORE BEING UPDATED — 510

DERIVE UPDATED FAULT SUBSET BASED ON THE DELTA USING SEQUENTIAL PATTERN MINING — 515

INJECT DERIVED UPDATED FAULT SUBSET INTO THE AT LEAST ONE MICROSERVICE BEING UPDATED IN THE CLOUD NATIVE BASED APPLICATION AND LOG BEHAVIOR OF THE AT LEAST ONE MICROSERVICE BEING UPDATED IN THE CLOUD NATIVE BASED APPLICATION — 520

GENERATE REPORT OF THE LOGGED BEHAVIOR OF THE AT LEAST ONE MICROSERVICE IN THE CLOUD NATIVE BASED APPLICATION — 525

FIG. 5

FAULT SET SELECTION

BACKGROUND

Aspects of the present invention relate generally to fault set selection and, more particularly, to drift driven dynamic and optimal subset non-functional test selection.

Chaos engineering (CE) is a process of injecting failures into a target system to assess its resiliency against adverse conditions. In other words, CE helps to determine the ability of an application to withstand turbulent conditions under different environments. In particular, CE tools allow users to simulate a number of faults with many possible parameters for each fault. Further, by simulating a number of faults with many possible parameters for each fault, a large number of fault scenarios may be generated.

SUMMARY

In a first aspect of the invention, there is a computer-implemented method including: receiving, by a processor set, a plurality of faults for at least microservice in a cloud native based application within a fault set selection server; injecting, by the processor set, the faults into the at least one microservice in the cloud native based application within the fault set selection server; obtaining, by the processor set, a system state representation for each of the injected faults in the at least one microservice in the cloud native based application using an unsupervised clustering algorithm; deriving, by the processor set, a fault subset based on the system state representation for each of the faults in the at least one microservice in the cloud native based application; and injecting, by the processor set, the derived fault subset into the at least one microservice in the cloud native based application and logging behavior of the at least one microservice in the cloud native based application with the injected derived fault subset.

In another aspect of the invention, there is a computer program product including one or more computer readable storage media having program instructions collectively stored on the one or more computer readable storage media. The program instructions are executable to: determine that at least one microservice in a cloud native based application is updated; determine a delta between the at least one microservice in the cloud native based application that is updated and the at least one microservice in the cloud native based application before being updated in response to a determination that the at least one microservice in the cloud native based application is updated; derive an updated fault subset using sequential pattern mining based on the delta between the at least one microservice in the cloud native based application that is updated and the at least one microservice in the cloud native based application before being updated; and inject the derived updated fault subset into the at least one microservice in the cloud native based application and log behavior of the at least one microservice in the cloud native based application with the injected derived updated fault subset.

In another aspect of the invention, there is a system including a processor set, one or more computer readable storage media, and program instructions collectively stored on the one or more computer readable storage media. The program instructions are executable to: receive a plurality of faults for at least one microservice in a cloud native based application within a fault set selection server; inject the faults into at least one microservice in the cloud native based application within the fault set selection server; obtain a system state representation for each of the injected faults in the at least one microservice in the cloud native based application using an unsupervised clustering algorithm; derive a fault subset based on the system state representation for each of the faults in the at least one microservice in the cloud native based application; inject the derived fault subset into the at least one microservice in the cloud native based application and log behavior of the at least one microservice in the cloud native based application with the injected derived fault subset; and generate a report of the logged behavior of the at least one microservice in the cloud native based application with the injected derived fault subset.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 3 shows a flowchart of an exemplary method of the fault set selection server in accordance with aspects of the present invention.

FIG. 5 shows a flowchart of another exemplary method of the fault set selection server in accordance with aspects of the present invention.

DETAILED DESCRIPTION

Figure 2:
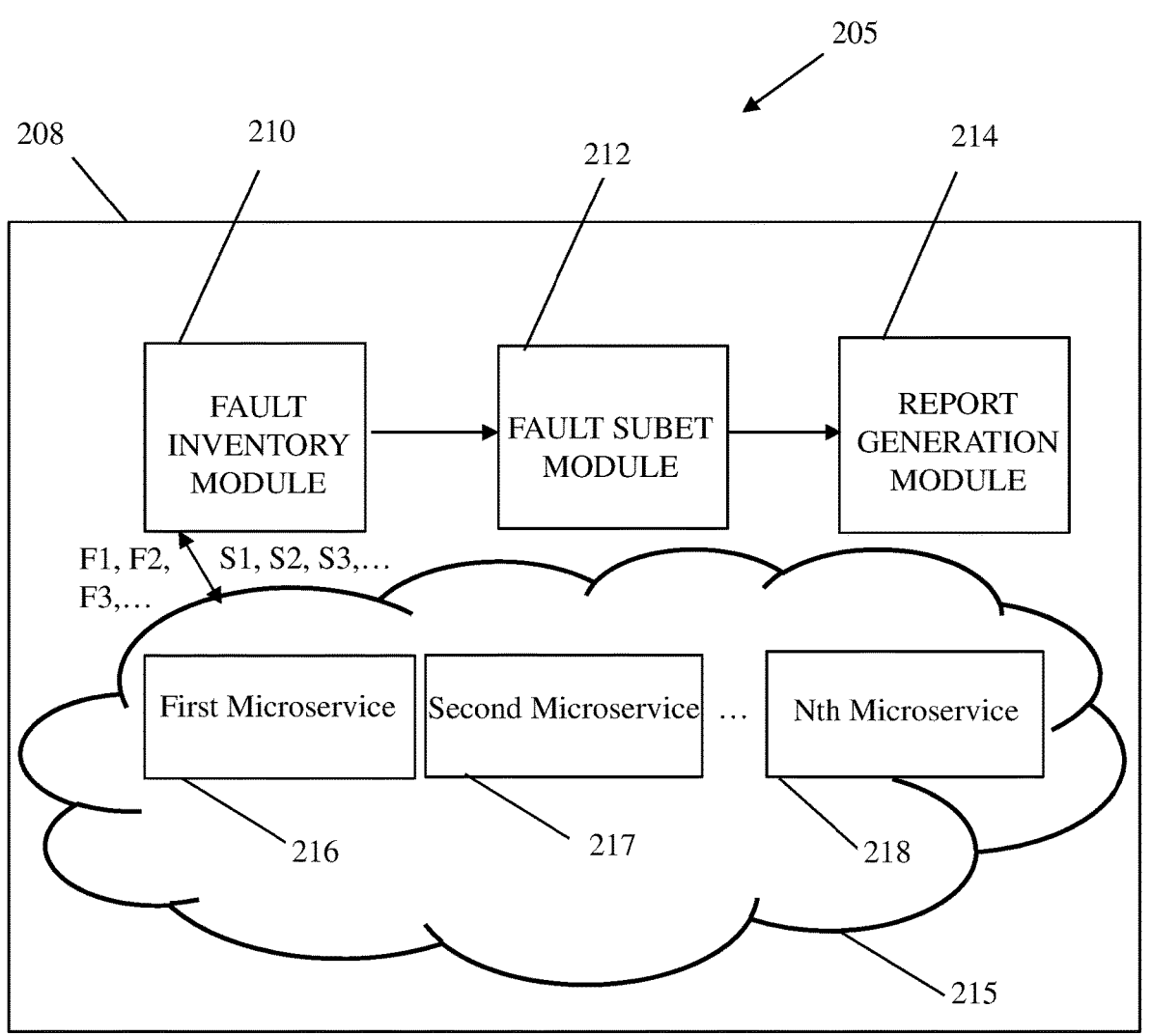
FIG. 2 shows a block diagram of an exemplary environment of a fault set selection server in accordance with aspects of the present invention.

Aspects of the present invention relate generally to fault set selection and, more particularly, to drift driven dynamic and optimal subset non-functional test selection. In particular, non-functional testing tests an overall system environment in which components work together in an integrated and connected infrastructure environment. Further, in embodiments, a fault is a deviation from an expected execution and a fault injection is an artificial process for voluntarily introducing faults to assess a capability of a system to withstand turbulent conditions Embodiments of the present invention optimally select a subset of faults from non-functional faults whose injection is equivalent and sufficient to an original fault set using an available context. In particular, the available context may include a fix applied, a version, an operating system level, a code file being updated, etc. Embodiments of the present invention incrementally update the subset of faults when the application is updated. In particular, the application may be updated during a major release, minor release, architectural change, adding services, removing services, etc. Embodiments of the present invention save time, save resources, and reduce complexity of test design and implementation in comparison to conventional chaos engineering (CE) systems. Embodiments of the present invention provide an equivalent fault subset of the original fault set. Embodiments of the present invention provide a new fault subset in response to an application being updated. Embodiments of the present invention utilize artificial intelligence (AI) to select a subset of faults from the original fault set. Embodiments of the present invention optimally select a representative subset of tests that are sufficient to validate a system state from an original set of tests available. Embodiments of the present invention incrementally update the representative subset of tests that are sufficient to validate the system state using a dynamically changing system state and context.

Embodiments of the present invention provide an intelligent subset fault selection process within a non-functional testing environment to reduce complexity in comparison to conventional chaos engineering (CE) systems. Conventional CE systems inject failures into a target system to assess resiliency against adverse conditions. However, conventional CE systems consume a large amount of time and resources to process all test scenarios. Further, conventional CE systems inject faults in a highly random, intuition based and/or exhaustive manner. Further, conventional CE systems do not leverage a system state in an intelligent manner to guide a fault injection process. Embodiments of the present invention optimally select a subset of faults from non-functional faults whose injection is equivalent and sufficient to an original fault set using an available context. Embodiments of the present invention also incrementally update the subset of faults when the application is updated. In aspects of the present invention, the subset of faults are selected by determining if a group of faults have a similar effect on the system.

Embodiments of the present invention reduce an overall time, resource, and complexity for non-functional testing. Accordingly, implementations of aspects of the present invention provide an improvement (i.e., technical solution) to a problem arising in the technical field of CE systems. In particular, embodiments of the present invention optimally select a representative subset of tests that are sufficient to validate the system state from the original set of tests available. Embodiments of the present invention incrementally update the representative subset of tests that are sufficient to validate the system state using the dynamically changing system state and context. Also, embodiments of the present invention may not be performed in a human mind because aspects of the present invention comprise using artificial intelligence (AI) and machine learning (ML) algorithms, such as sequential pattern mining, clustering algorithms, siamese neural networks, etc. Further, these implementations of the present invention are necessarily rooted in computer technology because they improve the functioning of the computer by improving the resiliency of the computer under adverse conditions.

Implementations of the invention are necessarily rooted in computer technology. For example, the step of obtaining a machine interpretable representation of a system state for each injected fault using an unsupervised clustering algorithm is computer-based and cannot be performed in the human mind. Training and using a machine learning model are, by definition, performed by a computer and cannot practically be performed in the human mind (or with pen and paper) due to the complexity and massive amounts of calculations involved. For example, a clustering algorithm may perform an iterative process of knowledge discovery and interactive multi-objective optimization that includes trial and error. In particular, a clustering algorithm performs a large amount of preprocessing of data and modeling of parameters across many dimensions to train the model such that the model generates an output in real time (or near real time). Given the scale and complexity of preprocessing data and modeling of parameters across many dimensions, it is simply not possible for the human mind, or for a person using pen and paper, to perform the number of calculations involved in training and/or using a machine learning model.

Aspects of the present invention include a method, system, and computer program product for drift driven dynamic and optimal subset non-functional test selection against cloud native microservices based applications. For example, a computer-implemented method includes: injecting faults into an application; obtaining a machine interpretable representation of a system state for each injected fault; clustering faults together into a subset of faults that result in similar system state changes based on the machine interpretable representations for the injected faults; and generating a report on the subset of faults that result in similar state changes based on the machine interpretable representations for the injected faults. The computer-implemented method may also include receiving an application update; and incrementally updating the subset of faults based on at least one of a change request for the application update, services interaction change, and an observable change in workload patterns.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as fault set selection code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the present invention. In embodiments, the environment 205 includes the fault set selection server 208, which may comprise one or more instances of the computer 101 of FIG. 1. In other examples, the fault set selection server 208 comprises one or more virtual machines or one or more containers running on one or more instances of the computer 101 of FIG. 1.

In embodiments, the fault set selection server 208 of FIG. 2 comprises a fault inventory module 210, a fault subset module 212, and a report generation module 214, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The fault set selection server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In FIG. 2, and in accordance with aspects of the invention, the fault inventory module 210 communicates with a cloud-based system 215 for each cloud native microservice based application (e.g., a first microservice 216, a second microservice 217, . . . , a nth microservice 218). In particular, the fault inventory module 210 communicates with at least one microservice in a cloud native based application (e.g., the first microservice 216) to generate all possible faults that can be injected for the at least one microservice in a cloud native based application (e.g., a first microservice). In particular, the fault inventory module 210 can store all possible generated faults in a hardware storage device or a database. However, embodiments are not limited.

In an example of the embodiments, the fault inventory module 210 injects a fault F1 into the first microservice 216 in a cloud native based application and obtains a machine interpretable system state S1 based on the injected fault F1. Further, the fault inventory module 210 injects a fault F2 into the first microservice 216 in a cloud native based application and obtains a machine interpretable system state S2 based on the injected fault F2. The fault inventory module 210 injects a combination of faults F1, F2 into the first microservice 216 in a cloud native based application and obtains a machine interpretable system state S3.

In embodiments, the fault inventory module 210 injects all possible generated faults into the at least one microservice in a cloud native based application (e.g., the first microservice 216) and collects logs, metrics, entities, traces, and telemetry data in a testing phase. In particular, the fault inventory module 210 generates all possible faults for the at least one microservice in a cloud native based application by determining all possible permutations and combinations of different faults and corresponding parameter values for each fault. In an example, the fault inventory module 210 generates all possible faults for the at least one microservice in a cloud native based application by simulating all possible permutations and combinations of fault types and corresponding parameter values for each fault. Further, after all possible generated faults are injected into the at least one microservice in a cloud native based application, the fault inventory module 210 obtains a machine interpretable system state representation for each of the possible generated faults based on the collected logs, metric, entities, traces, telemetry data, etc. of the at least one microservice in a cloud native based application with the injected faults. In embodiments, the fault inventory module 210 utilizes machine learning (ML) algorithms to obtain the machine interpretable system representation for each of the possible generated faults. In particular, the fault inventory module 210 utilizes an unsupervised clustering algorithm to obtain the machine interpretable system representation for each of the possible generated faults based on the collected logs, metric, entities, traces, telemetry data, etc. In further embodiments, the collected logs, metrics, entities, traces, and telemetry data are represented as events. In particular, the fault inventory module 210 obtains a fingerprint Ii for a fault which is a representation of a system state corresponding to a sequence of associated events based on Equations 1 and 2 below:

$$Ii = \{e_i{:}efiif(ei_1),\ ei_2{:}efiif(ei_2),\ \dots\ ,\ ei_n{:}efiif(ei_n)\}. \qquad \text{(Equation 1)}$$

$$efiif(ei) = ef(ei)/iif(ei). \qquad \text{(Equation 2)}$$

In Equation 1 above, $ei_1$, $ei_2$, and $ei_n$ represent entities (e.g., an entity of a first event $ei_1$, an entity of a second event $ei_2$, and an entity of an event $e_{in}$), ef(ei) represents an entity frequency of ei (i.e., a frequency of entity ei in a fault), if(ei) represents a fault frequency of ei (i.e., a count of a number of faults where entity ei occurs). In Equation 2, efiif(ei) represents a normalization of each entity. In embodiments, an entity is a defined expression of an event. Further, the fingerprint Ii is a vector representation for a fault for a system state. In embodiments, the fault inventory module 210 sends all possible generated faults (e.g., fault F1, fault F2, and a combination of faults F1, F2), fingerprints (e.g., fingerprint Ii), and the corresponding machine interpretable system states (e.g., the machine interpretable system state S1, the machine interpretable system state S2, and the machine interpretable system state S3) to a fault subset module 212.

In FIG. 2 and in accordance with aspects of the invention, the fault subset module 212 receives all possible generated faults (e.g., fault F1, fault F2, and a combination of faults F1, F2), fingerprints (e.g., fingerprint Ii), and the corresponding machine interpretable system states (e.g., the machine interpretable system state S1, the machine interpretable system state S2, and the machine interpretable system state S3) and derives a fault subset. In particular, the fault subset module 212 compares each of the machine interpretable system states (i.e., compares each of the machine interpretable system state S1, the machine interpretable system state S2, and the machine interpretable system state S3 to each other) to determine (i.e., derive) a fault subset which has similar effects on the system. In embodiments, the fault subset module 212 utilizes machine learning (ML) algorithms, such as an unsupervised clustering algorithm, to determine the fault subset which have similar effects on the system. For example, if the machine interpretable system state S1 is similar to the machine interpretable system state S2, the fault subset module determines a fault subset for the fault F1 and the fault F2. In this scenario, the fault subset module 212 reduces a number of injected faults from two (e.g., the fault F1 and the fault F2) to one injected fault subset (e.g., the fault F1) because both faults F1 and F2 have similar effects on the system. In other words, the fault subset module 212 selects a subset of faults that have an equivalent system state representation.

In embodiments, the fault subset module 212 optimizes a fault subset selection using fingerprinting. For example, if there are two fingerprints Ii and Ij, which are vector representations of faults for the system state, Equation 3 below is used to calculate cosine similarity between the two fingerprints Ii and Ij:

$$sim(I_i, I_j) = \frac{\sum_k^n efiif_i(ei_k) * efiif_j(ei_k)}{\sqrt{\sum_k^n efiit_i^2(ei_k)} * \sqrt{\sum_k^n efiif_j^2(ei_k)}}.$$  (Equation 3)

In embodiments, the fault subset module 212 optimizes a fault subset for non-functional test selection using cosine similarity between fingerprints to select a subset of faults that have an equivalent system state representation. In embodiments, the fault subset module 212 utilizes artificial intelligence (AI), such as a siamese neural network, to optimize the fault subset for non-functional test selection using cosine similarity between fingerprints to select the subset of faults that have the equivalent system state representation. In further embodiments, the fault subset module 212 groups system state representations together. In an example, assuming there are four fingerprints $[I_1, I_2, I_3, I_4,]$ for four faults and the cosine similarities are represented as $[(I_1, I_2, 0.9), (I_1, I_3, 0.8), (I_1, I_4, 0.45), (I_2, I_3, 0.35), (I_2, I_4, 0.76), (I_3, I_4, 0.762)]$, the fault subset module 212 groups a highest pair that has a cosine similarity greater than a threshold (e.g., 0.7). In this example, the fault subset module 212 reduces the set of fingerprints to $[(I_1, I_2), I_3, I_4)]$, in which $(I_1,I_2)$ is the highest pair of cosine similarities greater than 0.7. The fault subset module 212 then repeats the process for the reduced set of fingerprints $[(I_1,I_2), I_3, I_4)]$ with cosine similarities represented as $[((I_1, I_2), I_3, 0.57), ((I_1, I_2), I_4, 0.6), (I_3, I_4, 0.76)]$. In the reduced set of fingerprints, the fault subset module 212 groups a highest pair that has a cosine similarity greater than the threshold (e.g., 0.7). In this example, the fault subset module 212 further reduces the set of fingerprints to $[(I_1,I_2), (I_3, I_4)]$, in which $(I_3,I_4)$ has the highest pair of cosine similarities greater than 0.7. The fault subset module 212 repeats the process iteratively until there is no set of fingerprints left whose similarity is greater than the threshold (e.g., 0.7). In this example, the final reduced set of fingerprints is $[((I_1, I_2), (I_3,I_4), 0.59)]$. The fault subset module 212 uses the final reduced set of fingerprints and injects the faults corresponding to the final reduced set of fingerprints to the at least one microservice in a cloud native based application (e.g., a first microservice 216) and logs the behavior of the at least one microservice in a cloud native based application (e.g., the first microservice 216) against the injected faults corresponding to the final reduced set of fingerprints. The logged behavior of the at least one microservice in a cloud native based application (e.g., the first microservice 216) against the injected faults corresponding to the final reduced set of fingerprints is then sent to a report generation module 214.

In other embodiments, the fault subset module 212 picks a policy driven representative fault for each fault group. The fault subset module 212 picks the policy driven representative fault by at least one of the following policies: (1) a representative fault is the fault with the least amount of resource injection cost; (2) a representative fault is randomly chosen; (3) a representative fault is one with a least amount of blast radius/disruption (i.e., least amount of chaos); and (4) a representative fault is one that has been previously injected (e.g., automated policy). For example, by using the final reduced set of fingerprints of $[((I_1, I_2), (I_3,I_4), 0.59)]$ shown above, $I_1$ would be the representative fault in $(I_1, I_2)$. The fault subset module 212 uses the representative fault and injects the representative fault to the at least one microservice in a cloud native based application (e.g., the first microservice 216) and logs the behavior of the at least one microservice in a cloud based application (e.g., the first microservice 216) against the injected representative fault. The logged behavior of the at least one microservice in a cloud native based application (e.g., the first microservice 216) against the injected representative fault is then sent to a report generation module 214.

In further embodiments, the fault subset module 212 prioritizes the policies. For example, priority 1 is a resource injection cost, priority 2 is a blast radius/disruption, priority 3 is a most popular and/or most frequently used, priority 4 is a random selection, etc. The fault subset module 212 also applies each of the policies to the final reduced set of fingerprints to compute a score for selecting the representative fault. In an example, the fault subset module 212 selects the representative fault based on a policy with a highest score, and selects the representative fault based on a policy with a highest score and highest priority in response to a tie of the highest score between two faults of the final reduced set of fingerprints. In another example, the fault subset module 212 selects the representative fault based on a majority voting. In another example, the fault subset module 212 selects the representative fault that is the most popular and/or most frequently used. The fault subset module 212 uses the representative fault and injects the representative fault to the at least one microservice in a cloud native based application (e.g., the first microservice 216) and logs the behavior of the at least one microservice in a cloud based application (e.g., the first microservice 216) against the injected representative fault. The logged behavior of the at least one microservice in a cloud native based application (e.g., the first microservice 216) against the injected representative fault is then sent to a report generation module 214.

In FIG. 2 and in accordance with aspects of the invention, the report generation module 214 generates a consummation or actional report that is integrated with one of continuous integration (CI)/continuous deployment (CD) pipelines, fault management pipelines, and an automation incident creation. In embodiments, the report generation module 214 generates the consummation or actional report based on the received logged behavior of the at least one microservice in a cloud native based application against the injected represented fault from the fault subset module 212. In further embodiments, the report generation module 214 generates the consummation or actional report based on the received logged behavior of the at least one microservice in a cloud native based application against the injected representative fault so that a developer and/or the system of the embodiments can determine whether the injected representative fault accurately represents all possible injected faults. In particular, the report generation module 214 generates a javascript object notation (JSON) based output representing the affected services, injected fault, outcome (e.g., observed failure) which can be automated with a CI/CD pipeline with a next set of action in the CI/CD pipeline being determined based on the JSON output of the injected fault. The report generation module 214 generates an output which can be integrated with a fault management module based on a nature of the fault and the damage such that automated remediation may be performed by controllers. The report generation module 214 generates a report which includes the collected telemetry along with the injected fault, application states, and observed failures. Further, the report generation module 214 integrates the generated report with an incident management system (e.g., Jira, Git) in which tickets can be automatically raised upon failures or state breach along with all the collected telemetry.

FIG. 3 shows a flowchart of an exemplary method of the fault set selection server in accordance with aspects of the present invention. Steps of the method may be carried out in the environment of FIG. 2 and are described with reference to elements depicted in FIG. 2.

In embodiments, at step 305, the system receives, at the fault inventory module 210, all possible generated faults of at least one microservice in a cloud native based application. At step 310, the system injects, at the fault inventory module 210, all possible generated faults into the at least one microservice in a cloud native based application. At step 315, the system obtains, at the fault inventory module 210, a system state representation for each possibly generated fault using an unsupervised clustering algorithm.

In embodiments, at step 320, the system derives, at the fault subset module 212, a fault subset based on the obtained system state representation for each possibly generated fault. At step 325, the system injects, at the fault subset module 212, the fault subset into the at least one microservice in a cloud native based application and logs behavior of the at least one microservice in a cloud native based application against the injected fault subset. At step 330, the system generates, at the report generation module 214, a report of the logged behavior of the at least one microservice in a cloud native based application against the injected fault subsets.

Figure 4:
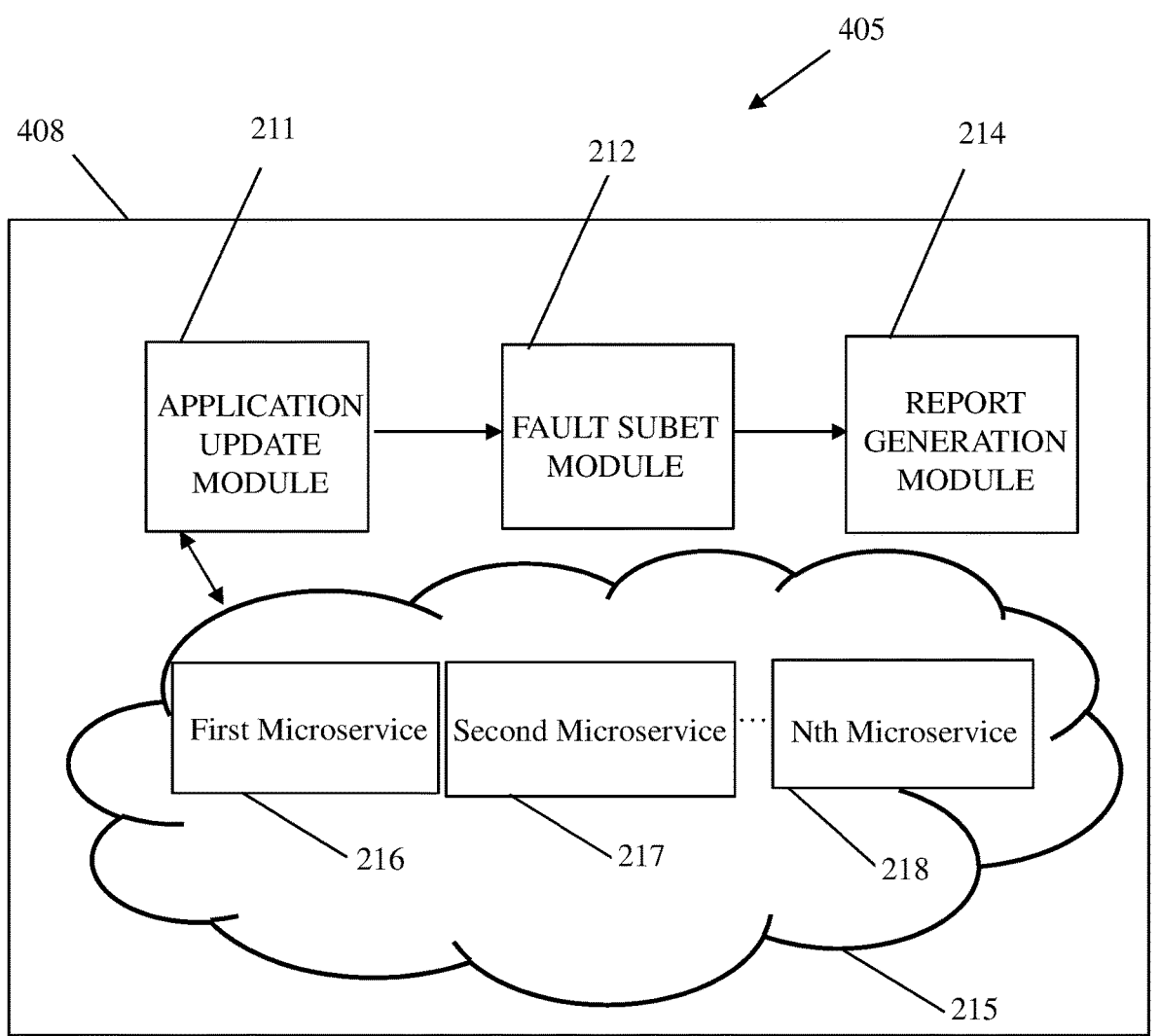
FIG. 4 shows a block diagram of another exemplary environment of the fault set selection server in accordance with aspects of the present invention.

FIG. 4 shows a block diagram of another exemplary environment 405 in accordance with aspects of the present invention. The environment 405 includes a fault set selection server 408, which may comprise one or more instances of the computer 101 of FIG. 1. In other examples, the fault set selection server 408 comprises one or more virtual machines or one or more containers running on one or more instances of the computer 101 of FIG. 1.

In embodiments, the fault set selection server 408 of FIG. 4 comprises an application update module 211, the fault subset module 212, and the report generation module 214, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The fault set selection server 408 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In FIG. 4, and in accordance with aspects of the invention, the application update module 211 communicates with a cloud-based system 215 for each microservice in a cloud native based application (e.g., a first microservice 216, a second microservice 217, . . . , a nth microservice based application 218). In particular, the application update module 211 communicates with at least one microservice application in a cloud native based application (e.g., a first microservice 216) to determine if the at least one microservice in a cloud native based application (e.g., a first microservice 216) has been changed due to a change request or receiving a new release. In particular, the application update module 211 communicates with at least one microservice in a cloud native based application (e.g., the first microservice 216) to determine if the at least one microservice in a cloud native based application (e.g., the first microservice 216) has been changed due to a change request or receiving a new release. In particular, the application update module 211 determines if the at least one microservice in a cloud native based application has been changed or receives a new release by determining whether there is a new service of the at last one microservice in a cloud native based application getting added because of a major release, an existing service of the at least one microservice in a cloud native based application getting substantial updates, interactions between services have an observed change through path traces, or workload patterns observed through an application and performance monitoring (APM) system indicate a change in service usage. In particular, the application updated module 211 identifies the interactions of each new service with other associated services. The application update module 211 also determines a delta for application services and interactions of the at least one microservice in a cloud native based application which has been changed or receives a new release and sends the delta for application services and interactions of the at least one microservice in a cloud native based application to the fault subset module 212. In an example, the application update module 211 determines the delta by determining the differences between the application services and interactions of the at least one microservice in a cloud native based application which has been changed and the application services and interactions of the at least one microservice in a cloud native based application before the change. In embodiments, the delta between the application services and interactions of the at least one microservice in a cloud native based application which has been changed and the application services and interactions of the at least one microservice in a cloud native based application before the change represents a drift driven dynamic for the cloud-based system 215.

In embodiments with regards to FIG. 4, the fault subset module 212 receives the delta for application services and interactions of the at least one microservice in a cloud native based application which has been changed and determines (i.e., derives) an updated fault subset based on the delta for application services and interactions of the at least one microservice in a cloud native based application which has been changed. In embodiments, the fault subset module 212 utilizes machine learning (ML) algorithms, such as a sequential pattern mining algorithm, to determine the updated fault subset for non-functional testing based on the delta (i.e., drift driven dynamic for the cloud-based system 215) for application services and interactions of the at least one microservice in a cloud native based application which has been changed. In particular, the fault subset module 212 determines the updated fault subset for non-functional testing based on similar processes (e.g., optimization of the updated fault subset selection for non-functional testing) as described in FIG. 2. In embodiments, the fault subset module 212 determines the updated fault subset by re-running the fault subset selection with faults and parameters on the new service and associated services. By re-running the fault subset selection with faults and parameters on the new service and associated services, a new alignment of faults is generated that results in the updated fault subset for non-functional testing. The fault subset module 212 uses the updated fault subset and injects the updated fault subset to the at least one microservice in a cloud native based application which has been changed and logs the behavior of the at least one microservice in a cloud native based application which has been changed against the injected updated fault subset. The logged behavior of the at least one microservice in a cloud native based application against the updated fault subset is then sent to a report generation module 214.

In embodiments with regards to FIG. 4, the report generation module 214 generates a report of the logged behavior of the at least one microservice in a cloud native based application which has been changed. In particular, the report generation module 214 performs similar processes (i.e., generation of a consummation or actional report that is integrated with one of continuous integration (CI)/continuous deployment (CD) pipelines, fault management pipelines, and an automation incident creation) as described in FIG. 2.

FIG. 5 shows a flowchart of an exemplary method of the fault set selection server in accordance with aspects of the present invention. Steps of the method may be carried out in the environment of FIG. 4 and are described with reference to elements depicted in FIG. 4.

In embodiments, at step 505, the system determines, at the application update module 211, whether at least one microservice in a cloud native based application is updated. At step 510, the system determines, at the application update module 211, a delta between the at least one microservice in a cloud native based application being updated and the at least one microservice in a cloud native based application before being updated in response to the at least one microservice in a cloud native based application being updated. In embodiments and as described with respect to FIG. 4, the application update module 211 determines the delta by determining the differences between the at least one microservice in a cloud native based application being updated and the at least one microservice in a cloud native based application before being updated.

In embodiments, at step 515, the system derives, at the fault subset module 212, an updated fault subset based on the delta between the at least one microservice in a cloud native based application being updated and the at least one microservice in a cloud native based application before being updated. At step 520, the system injects, at the fault subset module 212, the derived updated fault subset into the at least one microservice in a cloud native based application being updated and logs behavior of the at least one microservice in a cloud native based application being updated against the injected derived updated fault subset. At step 525, the system generates, at the report generation module 214, a report of the logged behavior of the at least one cloud microservice in a cloud native based application being updated against the injected derived updated fault subset.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by a processor set, a plurality of faults for at least one cloud microservice in a cloud native based application within a fault set selection server;

injecting, by the processor set, the faults into at least one microservice in the cloud native based application within the fault set selection server;

obtaining, by the processor set, a system state representation for each of the injected faults in the at least one microservice in the cloud native based application using an unsupervised clustering algorithm;

deriving, by the processor set, a fault subset based on the system state representation for each the faults in the at least one microservice in the cloud native based application; and injecting, by the processor set, the derived fault subset into the at least one microservice in the cloud native based application and logging behavior of the at least one microservice in the cloud native based application with the injected derived fault subset.

2. The computer-implemented method of claim 1, further comprising generating a report of the logged behavior of the at least one microservice in the cloud native based application with the injected derived fault subset.

3. The computer-implemented method of claim 1, wherein the deriving the fault subset based on the system state representation comprises obtaining at least one fingerprint which corresponds with the system state representation.

4. The computer-implemented method of claim 3, wherein the deriving the fault subset based on the system state representation further comprises selecting the fault subset using cosine similarity between at least two fingerprints of the at least one fingerprint to optimize the fault subset.

5. The computer-implemented method of claim 3, wherein the deriving the fault subset based on the system state representation comprises selecting a policy driven representative fault which corresponds with the system state representation based on at least one policy.

6. The computer-implemented method of claim 5, wherein the selecting the policy driven representative fault comprises selecting at least one selected from a group consisting of: a least amount of resource injection cost, a randomly chosen policy driven representative fault, the policy driven representative fault with a least amount of disruption, and the policy driven representative fault which has been previously injected.

7. The computer-implemented method of claim 5, further comprising computing a score for the policy driven representative fault.

8. The computer-implemented method of claim 7, wherein the selection of the policy driven representative fault is further based on the score.

9. The computer-implemented method of claim 6, further comprising prioritizing each of the at least one policy.

10. The computer-implemented method of claim 9, wherein the selection of the policy driven representative fault is further based on priorities of the at least one policy.

11. The computer-implemented method of claim 1, wherein the deriving the fault subset is based on similar state representations for each fault within the fault subset.

12. A system comprising:

a processor set, one or more computer readable storage media, and program instructions collectively stored on the one or more computer readable storage media, the program instructions executable to:

receive a plurality of faults for at least one microservice in a cloud native based application within a fault set selection server;

inject the faults into at least one microservice in the cloud native based application within the fault set selection server;

obtain a system state representation for each of the injected faults in the at least one microservice in the cloud native based application using an unsupervised clustering algorithm;

derive a fault subset based on the system state representation for each the faults in the at least one cloud microservice in the cloud native based application;

inject the derived fault subset into the at least one microservice in the cloud native based application and log behavior of the at least one microservice in the cloud native based application with the injected derived fault subset; and generate a report of the logged behavior of the at least one microservice in the cloud native based application with the injected derived fault subset.

13. The system of claim 12, wherein the deriving the fault subset based on the system state representation comprises obtaining at least one fingerprint which corresponds with the system state representation.

14. The system of claim 13, wherein the deriving the fault subset based on the system state representation further comprises selecting the fault subset using cosine similarity between at least two fingerprints of the at least one fingerprint to optimize the fault subset.

15. The system of claim 12, wherein the deriving the fault subset based on the system state representation comprises selecting a policy driven representative fault which corresponds with the system state representation based on at least one policy.

* * * * *